(12) United States Patent
Fukui

(10) Patent No.: US 6,691,615 B2
(45) Date of Patent: Feb. 17, 2004

(54) DRUM FOR FIXING SHEET-TYPE MEMBER

(75) Inventor: Takashi Fukui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 94 days.

(21) Appl. No.: 10/066,581

(22) Filed: Feb. 6, 2002

(65) Prior Publication Data

US 2002/0144618 A1 Oct. 10, 2002

(30) Foreign Application Priority Data

Feb. 7, 2001 (JP) .......................................... 2001-31375

(51) Int. Cl.[7] .............................. B41F 27/12; H04N 1/08
(52) U.S. Cl. ...................... 101/409; 101/415.1; 492/22; 492/39; 492/45; 346/138; 271/277
(58) Field of Search ............................... 101/415.1, 477, 101/409, 230; 492/25, 39, 22, 38, 40, 45; 346/138; 271/277, 275, 82

(56) References Cited

U.S. PATENT DOCUMENTS

| | | | |
|---|---|---|---|
| 4,517,575 A | * 5/1985 | Kakimoto et al. | .......... 346/138 |
| 4,943,045 A | * 7/1990 | Van Horne et al. | ......... 271/277 |
| 5,067,705 A | * 11/1991 | Van Horne et al. | ......... 271/277 |

* cited by examiner

Primary Examiner—Leslie J. Evanisko
(74) Attorney, Agent, or Firm—Sughrue Mion, PLLC

(57) ABSTRACT

A printing plate is only guided by and wound around peripheral surfaces of cylinders. The cylinders are disposed along an axis of a rotating shaft at predetermined intervals, and support the entire printing plate with substantially equal balance. The printing plate has a degree of firmness, and thus, the printing plate can hold itself in a substantially cylindrical shape even if it is merely rolled in the air. Therefore, the whole printing plate can be accurately wound and held onto a peripheral locus of a predetermined radius coaxial with the rotating shaft merely by disposing guide members as auxiliary guides for positioning and winding parts of the printing plate.

10 Claims, 7 Drawing Sheets

DRUM FOR FIXING SHEET-TYPE MEMBER

BACKGROUND OF THE INVENTION

1. Field of the Invention

The present invention relates to a drum (rotating body) for disposing a sheet-type member on a circumferential locus of a predetermined radius centering around a rotation axis.

2. Description of the Related Art

Conventionally, some image exposure apparatuses, which subject printing plates to image exposure, wind a printing plate onto a rotating drum and irradiate the printing plate with a light beam in accordance with image data while rotating the printing plate integrally with the rotating drum, so as to scan-expose the printing plate.

When the printing plate is wound onto the rotating drum, the printing plate is fixed onto the rotating drum by chucks so that both edges of the printing plate on a peripheral surface of the rotating drum are nipped between the chucks and the peripheral surface of the rotating drum.

Namely, a chuck which corresponds to one edge of the printing plate on the peripheral surface of the rotating drum (e.g., a leading edge thereof in a direction it is wound) is attached in advance at a predetermined position on the rotating drum, and another chuck which corresponds to the other edge of the printing plate (e.g., a trailing edge thereof in a direction it is wound) is attached at a position on the rotating drum in accordance with the size of the printing plate after the printing plate has been wound onto the rotating drum.

The drum used in the above-described image exposure apparatus has a peripheral surface in a cylindrical shape. The printing plate is brought into tight contact with the peripheral surface of the drum in order to determine a position of the printing plate in a thickness direction, so that the printing plate can correspond to a depth of focus of a light beam for scan-exposure.

However, in the conventional drum, at least the peripheral surface thereof needs to have an unfolded area which is larger than an area of the printing plate. Therefore, when a large-sized printing plate is used, a large-sized drum needs to be prepared. When the drum is enlarged, weight thereof is increased and rotation speed thereof is decreased. In order to realize a high-speed processing, a high-power driving system is required to prevent the decrease of the rotation speed.

SUMMARY OF THE INVENTION

In view of the above facts, an object of the present invention is to obtain a rotating body, whose weight is not increased even when it is enlarged so as to correspond to a large-sized sheet-type member, which can reliably wind and hold the sheet-type member thereon, and which can prevent a high-power driving system resulting from its increased weight.

In order to attain the above object, in accordance with an aspect of the present invention, there is provided a skeleton drum around which a sheet can be wound and fixed, the drum comprising: (A) a rotating shaft; (B) a plurality of narrow cylindrical supports, each support having a support surface for supporting the sheet and being arranged so as to be coaxial with the rotating shaft such that an interval, which is larger than a width of the support, is formed between the supports; and (C) a plurality of chucks for pressing a leading edge and a trailing edge of the sheet toward the rotating shaft.

In accordance with another aspect of the present invention, there is provided a skeleton drum around which a sheet can be wound and fixed, the drum comprising: (a) a rotating shaft; (B) a plurality of wide cylindrical supports, each support having a support surface for supporting the sheet and being arranged so as to be coaxial with the rotating shaft such that an interval, which is smaller than a width of the each support, is formed between the supports; and (C) a plurality of chucks for pressing a leading edge and a trailing edge of the sheet toward the rotating shaft.

In accordance with still another aspect of the present invention, there is provided a skeleton drum, around which a sheet can be wound and fixed, and which has a substantial star-shape in sectional view, the drum comprising: (a) a rotating shaft; (b) a plurality of plates, each of the plates extending radially from an external periphery of the rotating shaft, and having a support surface for supporting the sheet; and (c) a plurality of chucks for pressing a leading edge and a trailing edge of the sheet toward the rotating shaft.

DESCRIPTION OF THE PREFERRED EMBODIMENTS

First Embodiment

Figure 1:
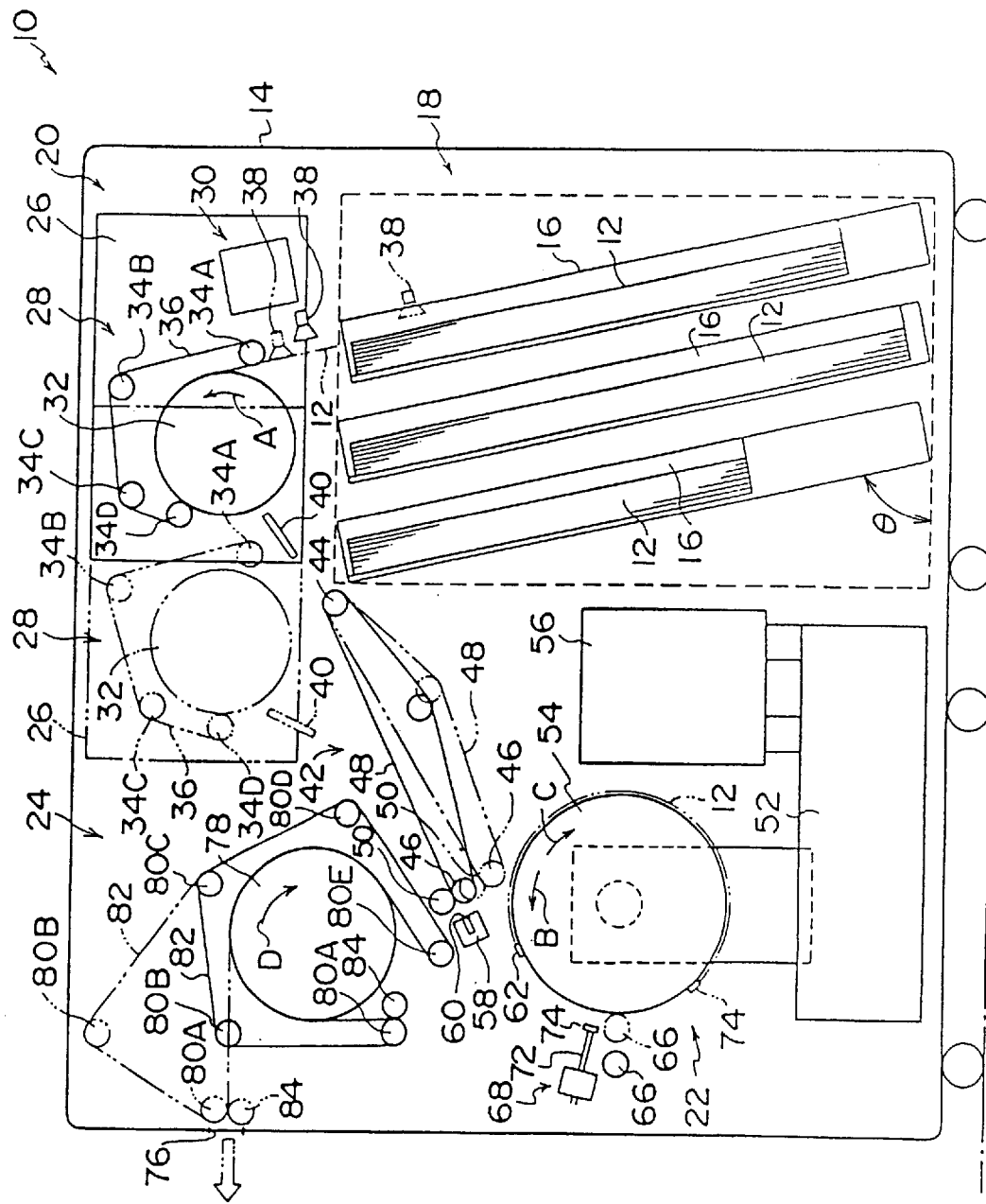
FIG. 1 is a schematic structural view showing an image exposure apparatus according to the present invention (corresponding to both first and second embodiments).

Hereinafter, a preferred embodiment of the present invention will be described with reference to drawings. FIG. 1 shows a schematic structure of an image exposure apparatus 10 according to a first embodiment. The image exposure apparatus 10 uses as a sheet-type member a photosensitive planographic printing plate 12 (hereinafter, referred to as a "printing plate") comprising a photosensitive layer formed on a thin, rectangular plate-type support made of, for example, aluminum (for example, the printing plate 12 has thickness dimension t of 0.3 mm and consistency c of $2.7 \times 10^3$ kg/m$^3$). The printing plate 12 is irradiated with a light beam modulated on the basis of image data, whereby the printing plate 12 is scan-exposed. The printing plate 12, for which image exposure has been completed by the image exposure apparatus 10, is then subjected to development processing and the like by an unillustrated automatic developing apparatus and the like. The minimum size of the printing plate 12 used in the first embodiment is 500×500× 0.2 mm, and the maximum size thereof is 1,160×940×0.3 mm.

A cassette loading section 18, a plate supplying/ conveying section 20, a recording section 22 and a discharge buffer section 24 are provided inside a casing 14 of the image exposure apparatus 10. The cassette loading section 18 is disposed at a lower-right side in the casing 14 as shown in FIG. 1. In the cassette loading section 18, a plurality of cassettes 16, each accommodating a plurality of printing plates 12, is loaded in a state in which the cassettes 16 are inclined at predetermined angle θ.

It is possible to process in the image exposure apparatus 10 numerous-sized printing plates 12 having different longitudinal and transverse dimensions. Printing plates 12 of whatever size are accommodated in the cassettes 16 such that the photosensitive layers of the printing plates 12 face upward and an end thereof is positioned to correspond to a predetermined position. Further, a plurality of the cassettes 16 is loaded at predetermined intervals in the cassette loading section 18 such that an end of the printing plates 12 accommodated in each cassette 16 reaches a substantially constant height.

The plate supplying/conveying section 20 is disposed above the cassette loading section 18, and the recording section 22 is disposed at a lower, central area within of the apparatus, adjacent to the cassette loading section 18. The plate supplying/conveying section 20 is provided with a pair of side panels 26 (in FIG. 1, only one side panel 26 is shown), and an inverting unit 28 and a feed unit 30 are mounted onto the side panels 26.

The inverting unit 28 includes an inverting roller 32 having an external diameter of a predetermined dimension, and a plurality of small rollers (in the first embodiment, four small rollers 34A, 34B, 34C and 34D are shown as an example) is provided around the inverting roller 32. The small rollers 34A through 34D are disposed so as to straddle the reverse roller 32 from the cassette loading section 18 to the recording section 22, and an endless conveyor belt 36 is entrained between the small rollers 34A to 34D. Accordingly, the conveyor belt 36 is wound on the inverting roller 32 so that the conveyor belt 36 is wound on roughly half the circumference of the inverting roller 32 between the small roller 34A and the small roller 34D.

The feed unit 30 includes a plurality of suction cups 38 that suck the top end of the printing plate 12 inside the cassette 16. The suction cups 38 are lowered to oppose the top end of the printing plate 12 inside the cassette 16 loaded in the cassette loading section 18, whereby the printing plate 12 is sucked. The feed unit 30 then raises the suction cups 38 which have sucked the printing plate 12 whereby the printing plate 12 is pulled out from the cassette 16 and a leading edge of the pulled out printing plate 12 is inserted between the inverting roller 32 and the conveyor belt 36. In FIG. 1, movement positions of the suction cups 38 are schematically shown with two-dot chain lines.

At the inverting unit 28, the inverting roller 32 and the conveyor belt 36 rotate in the direction that the printing plate 12 is pulled out from the cassette 16 (direction of arrow A in FIG. 1). Accordingly, while the printing plate 12 is being nipped between the inverting roller 32 and the conveyor belt 36, the printing plate 12 is pulled out from the cassette 16 and wound onto the inverting roller 32. As a result, the printing plate 12 is curved and conveyed such that the direction in which the printing plate 12 is conveyed is inverted. The radius of the inverting roller 32 is of a dimension (e.g., 100 mm or more) such that kinks or bends are not generated in the printing plate 12 when the printing plate 12 is curved.

As shown with solid lines and two-dot chain lines in FIG. 1, the side panels 26 horizontally move in accordance with the position of the cassette 16 from which the printing plate 12 is pulled out. Thus, the suction cups 38 of the feed unit 30 oppose the printing plate 12 within the cassette 16 that has been selected.

Further, on the side panels 26, a guide 40 is provided below the small roller 34D. The printing plate 12 which has been inverted by the inverting roller 32 is sent out from between the inverting roller 32 and the conveyor belt 36 toward the guide 40 at the small roller 34D side. A conveyor 42 is disposed above the recording section 22, and the printing plate 12 which has been sent out from the inverting unit 28 is guided to the conveyor 42 by the guide 40.

When the side panels 26 move, the guide 40 swings so as to always orient the direction in which the printing plate 12 is guided to the conveyor 42. When the side panels 26 move, the small roller 34D at the recording section 22 side moves so as to change the direction in which the printing plate 12 is sent out from the inverting unit 28, and when the small roller 34D moves, the small roller 34C moves so as to apply substantially constant tension to the conveyor belt 36. As a result, the printing plate 12 sent out from the inverting unit 28 is gently curved by the guide 40.

In the conveyor 42, a conveyor belt 48 is entrained between a roller 44 adjacent to an area below the plate supplying/conveying section 20 and a roller 46 adjacent to an area above the recording section 22. The conveyor 42 is inclined so that the roller 46 is disposed lower than the roller 44.

Figure 2:
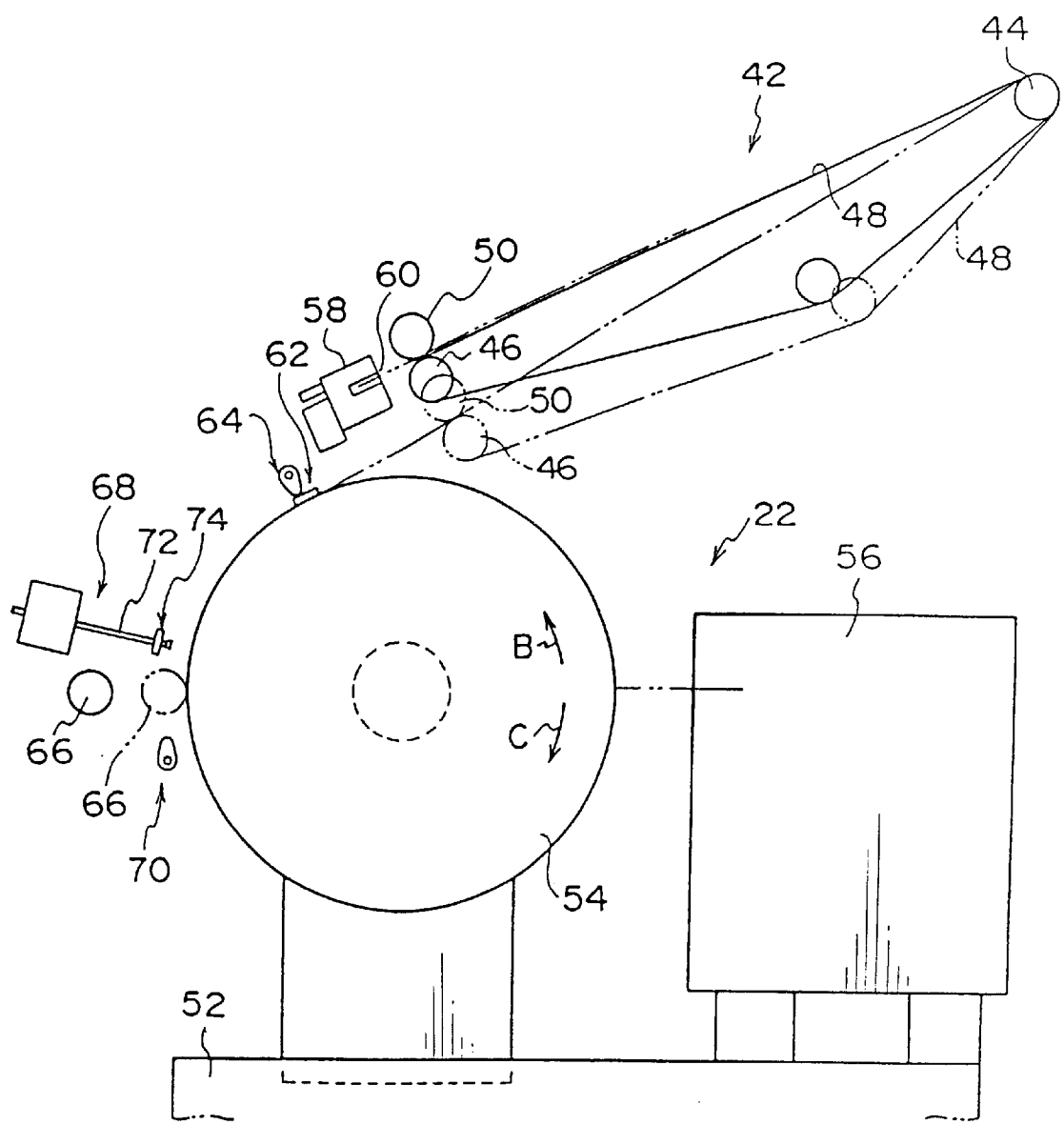
FIG. 2 is a schematic structural view showing a recording portion of the image exposure apparatus (corresponding to both first and second embodiments).

As shown in FIGS. 1 and 2, in the conveyor 42, a roller 50 is disposed opposite to the roller 46. The printing plate 12 which has been sent onto the conveyor 42 is conveyed on the conveyor belt 48, and nipped between the rollers 46 and 50. In the recording section 22, a rotating drum 54 and a recording head portion 56 are mounted on a rack 52. Further, a puncher 58 is disposed above the rotating drum 54. The rotating drum 54 has radius r of 0.165 m.

As shown in FIG. 2, a gripper 60 is formed at the puncher 58. The conveyor 42 nips the printing plate 12 between the rollers 46 and 50, and inserts the leading edge of the printing plate 12 into the gripper 60 of the puncher 58 so as to hold it. When the leading edge of the printing plate 12 has been inserted into the gripper 60, the puncher 58 forms, for example, a notch for positioning, at a predetermined position in the leading edge of the printing plate 12.

When the notch has been formed at the printing plate 12, the conveyor 42 reversely drives the rollers 46 and 50 as well as the conveyor belt 48 so as to pull out the leading edge of the printing plate 12 from the gripper 60 of the puncher 58. The conveyor 42 is provided with an unillustrated swinging apparatus, and lowered on an axis of the roller 44 by the swinging apparatus such that the roller 46 approaches the rotating drum 54 of the recording section 22 (this movement is shown with two-dot chain lines in FIGS. 1 and 2). As a result, the leading edge of the printing plate 12 on the conveyor belt 48 is oriented toward a predetermined position on an external peripheral surface of the rotating drum 54, and the printing plate 12 is conveyed on the conveyor belt 48 toward the rotating drum 54.

The rotating drum 54 is rotated by an unillustrated driving means in the direction in which the printing plate 12 is attached to the rotating drum 54 and exposed thereon (i.e., the direction of arrow B in FIGS. 1 and 2) and in the direction in which the printing plate 12 is detached from the rotating drum 54 (i.e., the direction of arrow C in FIGS. 1 and 2, which direction is opposite that of the direction in which the printing plate 12 is attached to the rotating drum 54 and exposed thereon).

As shown in FIG. 2, a leading edge chuck 62 is attached at a predetermined position on the external peripheral surface of the rotating drum 54 provided in the recording section 22. In the recording section 22, when the printing plate 12 is attached to the rotating drum 54, the rotating drum 54 is initially stopped at a position where the leading edge chuck 62 opposes the leading edge of the printing plate 12 sent by the conveyor 42 (i.e., the position at which the printing plate 12 is attached to the rotating drum 54).

The recording section 22 is provided with an attachment cam 64 opposite to the leading edge chuck 62 at the position at which the printing plate 12 is attached to the rotating drum 54. When the attachment cam 64 is rotated, one end of the leading edge chuck 62 is pressed by the attachment cam 64. This enables the printing plate 12 to be inserted between the other end of the leading edge chuck 62 and the peripheral surface of the rotating drum 54. In the recording section 22, in this state in which the leading edge of the printing plate 12 has been inserted between the leading edge chuck 62 and the rotating drum 54, the attachment cam 64 is returned to the original position so as to be released from pressing the leading edge chuck 62, whereby the leading edge of the printing plate 12 can be nipped and held between the leading edge chuck 62 and the peripheral surface of the rotating drum 54. At this time, an unillustrated positioning pin protruding at a predetermined position on the peripheral surface of the rotating drum 54 is inserted into the notch formed by the puncher 58 to position the printing plate 12 on the rotating drum 54.

In the recording section 22, when the leading edge of the printing plate 12 is fixed on the rotating drum 54, the rotating drum 54 is rotated in the direction in which the printing plate 12 is attached to the rotating drum 54 and exposed thereon. Accordingly, the printing plate 12 sent from the conveyor 42 is wound on the peripheral surface of the rotating drum 54.

A squeeze roller 66 is disposed near the peripheral surface of the rotating drum 54 and further downstream, in the direction in which the printing plate 12 is attached to the rotating drum 54 and exposed thereon, than the position at which the printing plate 12 is attached to the rotating drum 54. The squeeze roller 66 moves toward the rotating drum 54, and presses the printing plate 12 wound onto the rotating drum 54 toward the rotating drum 54 so as to bring the printing plate 12 into close contact with the peripheral surface of the rotating drum 54.

Further, a trailing edge chuck attachment/detachment unit 68 is disposed near a further upstream side than the squeeze roller 66 in the direction in which the printing plate 12 is attached to the rotating drum 54 and exposed thereon. A detachment cam 70 is disposed near a further downstream side than the squeeze roller 66 in the direction in which the printing plate 12 is attached to the rotating drum 54 and exposed thereon. In the trailing edge chuck attachment/detachment unit 68, a trailing edge chuck 74 is attached to a distal end of a shaft 72 that protrudes toward the rotating drum 54.

The printing plate 12 is positioned by an unillustrated mechanism such that the trailing edge chuck attachment/detachment unit 68 opposes the trailing edge of the printing plate 12 that is wound around the rotating drum 54. When the trailing edge chuck attachment/detachment unit 68 has opposed the trailing edge of the printing plate 12, the shaft 72 is protruded so that the trailing edge chuck 74 is attached and fixed at the predetermined position on the rotating drum 54. As a result, the trailing edge of the printing plate 12 is nipped and held between the trailing edge chuck 74 and the rotating drum 54.

When the leading edge and the trailing edge of the printing plate 12 have been held on the rotating drum 54, the squeeze roller 66 is separated therefrom. Then, in the recording section 22, while the rotating drum 54 is rapidly rotated at a predetermined rotational speed, the printing plate 12 is irradiated with a light beam modulated on the basis of image data emitted from the recording head portion 56 synchronously with the rotation of the rotating drum 54. In this way, the printing plate 12 is scan-exposed on the basis of the image data.

After scan-exposure of the printing plate 12 has been completed, the rotation of the rotating drum 54 is stopped when the trailing edge chuck 74 holding the trailing edge of the printing plate 12 positions opposite to the trailing edge chuck attachment/detachment unit 68. The squeeze roller 66 moves toward the rotating drum 54 to press the printing plate 12. After that, the trailing edge chuck attachment/detachment unit 68 receives the trailing edge chuck 74, and separates the trailing edge chuck 74 from the rotating drum 54. As a result, the trailing edge of the printing plate 12 is completely released.

After the trailing edge chuck 74 has been detached from the rotating drum 54, the rotating drum 54 is rotated in the direction in which the printing plate 12 is detached therefrom. Accordingly, the printing plate 12 is sent out from between the squeeze roller 66 and the rotating drum 54.

In the same manner as the leading edge chuck 62, the trailing edge chuck 74 may be an opening/closing type fixed in advance on the rotating drum 54 instead of the attachment/detachment type.

As shown in FIG. 1, the discharge buffer section 24 is provided above the squeeze roller 66. When the rotating drum 54 is rotated in the direction in which the printing plate 12 is detached therefrom, the trailing edge of the printing plate 12 is sent out toward the discharge buffer section 24. Further, when the rotating drum 54 is rotated in the direction in which the printing plate 12 is detached therefrom (in the direction of arrow C), if the leading edge chuck 62 has reached the position at which the printing plate 12 is detached from the rotating drum 54, which position is opposite to the detachment cam 70, the rotating drum 54 is stopped. In the recording section 22, the detachment cam 70 is rotated at this position so as to press the leading edge chuck 62, and the leading edge of the printing plate 12 is released from being nipped between the leading edge chuck 62 and the rotating drum 54. As a result, the printing plate 12 is detached from the rotating drum 54.

The discharge buffer section 24 includes a discharge roller 78, which is provided at an inner side of a discharge port 76 formed at the casing 14. A plurality of small rollers (small rollers 80A, 80B, 80C, 80D and 80E are shown as an example) are disposed around the discharge roller 78, and an endless conveyor belt 82 is entrained between the small rollers 80A to 80E. The conveyor belt 82 is thus entrained between the small rollers 80A through 80E around the discharge roller 78 in a range of between ½ to ¾ the circumference of the discharge roller 78.

The small roller 80A protrudes toward the squeeze roller 66 side of the recording section 22, and a roller 84 is disposed opposite to the small roller 80A. The printing plate 12 which has been sent out from the recording section 22 is guided toward between the small roller 80A and the roller 84 to be nipped therebetween.

In the discharge buffer section 24, when the discharge roller 78 is rotatably driven in a direction in which the printing plate 12 is pulled in (direction of arrow D), the printing plate 12 which has been nipped between the small roller 80A and the roller 84 is pulled out from the recording section 22 and guided to between the discharge roller 78 and the conveyor belt 82. Then, the printing plate 12 is nipped between the discharge roller 78 and the conveyor belt 82, and wound around the discharge roller 78. At this time, in the discharge buffer section 24, the leading edge portion of the printing plate 12 (the trailing edge side thereof in the direction in which it is sent out from the recording section 22) is nipped between the small roller 80A and the roller 84, whereby the printing plate 12 which has been wound onto the discharge roller 78 is temporarily held.

As shown with two-dot chain lines in FIG. 1, in the discharge buffer section 24, the small roller 80A and the roller 84 move to a position which faces the discharge port 76. At this time, the small roller 80A and the idle roller 84 move integrally such that the leading edge of the printing plate 12 is oriented toward the discharge port 76. The small roller 80B, which is above the small roller 80A, moves in accordance with the movement of small roller 80B so as to apply constant tension to the conveyor belt 82.

In the discharge buffer section 24, when the leading edge of the printing plate 12 has been oriented to the discharge port 76, the discharge roller 78 is rotatably driven in the direction in which the printing plate 12 is sent out (direction which is opposite to arrow D) at a rotational speed in accordance with the speed at which the printing plate 12 is conveyed by processing apparatuses, such as an automatic development apparatus, disposed adjacent to the discharge port 76. Accordingly, the printing plate 12 is sent out from the discharge port 76.

Figure 3:
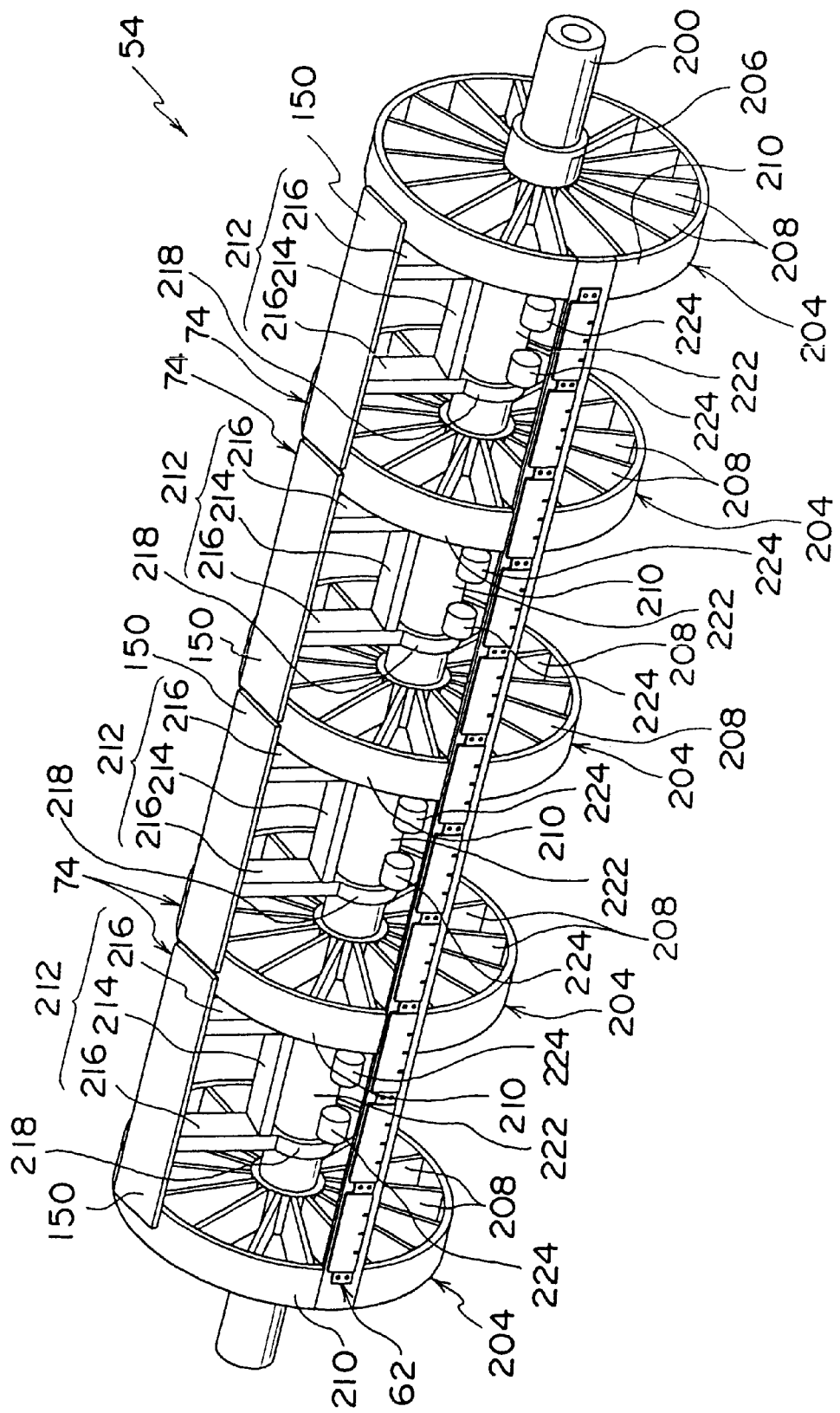
FIG. 3 is a schematic perspective view of a rotating drum according to the first embodiment.

FIG. 3 shows a structure of the rotating drum 54 in detail.

Both ends of a rotating shaft 200 are pivotally supported by unillustrated bearings, and a connecting member (e.g., a gear or a sprocket) of a driving system is attached to one end of the rotating shaft 200. Thus, when the connecting member receives rotation force of a driving portion, the rotating shaft 200 can rotate.

A length of the rotating shaft 200 in an axial direction is set to be larger than the maximum width of the printing plate 12.

Wheel-shaped guide members 204 are attached to the rotating shaft 200 in the axial direction at predetermined intervals.

In the guide member 204, ribs 208 having short widths extend radially from a bearing 206 into which the rotating shaft 200 is inserted and fitted. The ribs 208 have thin-plate shapes, and longitudinal dimensions thereof are substantially identical to each other.

Outer ends of the ribs 208 are fixed to an inner peripheral surface of cylinders 210. Namely, the rotating shaft 200 supports the cylinders 210 with the ribs 208. A width of the cylinder 210 is substantially identical to that of the ribs 208.

The guide member 204 is composed of the ribs 208 and the cylinder 210. An outer periphery of the cylinder 210 is located around a circumferential locus of predetermined radius of the rotating shaft 200, and serves as a surface onto which the printing plate 12 is wound.

In the first embodiment, multiple (five) guide members 204 are disposed along the axis of the rotating shaft 200.

Thus, along the axis of the rotating shaft 200, only areas of the printing plate 12 corresponding to the cylindrical bodies 210 are supported, and the other areas are suspended between the cylindrical bodies 210. In the first embodiment, a ratio of the supported width of the printing plate 12 to the entire width thereof, in consideration of the material and the thickness of the printing plate 12, is ⅕.

Chuck holders 212 are provided at the rotating shaft 200 between the guide members 204. The chuck holders 212 comprise a base 214, which is disposed around a peripheral surface of the rotating shaft 200, and a pair of arms 216 that extend radially, relative to the rotating shaft 200, from both longitudinal ends of the base 214 and are parallel to each other.

The rotating shaft 200 is inserted through rings 218 which are provided at both longitudinal ends of the base 214, and the chuck holder 212 is thereby supported so that it can rotate relative to the rotating shaft 200.

An attachment/detachment portion 220 (see FIG. 4) for the trailing edge chuck 74, which is a fixing means, is formed at a distal end of the arms 216 of the chuck holders 212 so that the trailing edge chuck 74 can be attached to and detached from the chuck holder 212. Further, a cylinder 222, onto which the base 214 is fixed, is provided between the rings 218 of the chuck holders 212.

The cylinder 222 is pivotally supported by the rotating shaft 200, and constant force springs 224 are attached to portions of an outer periphery of the cylinder 222. Although a detailed description will be omitted, the constant force springs 224 serve to urge the chuck holders 212 in a direction which makes the printing plate 12 taut, in a state in which the printing plate 12 is held by the trailing edge chucks 74 that have been attached to the attachment/detachment portions 220.

Figure 4:
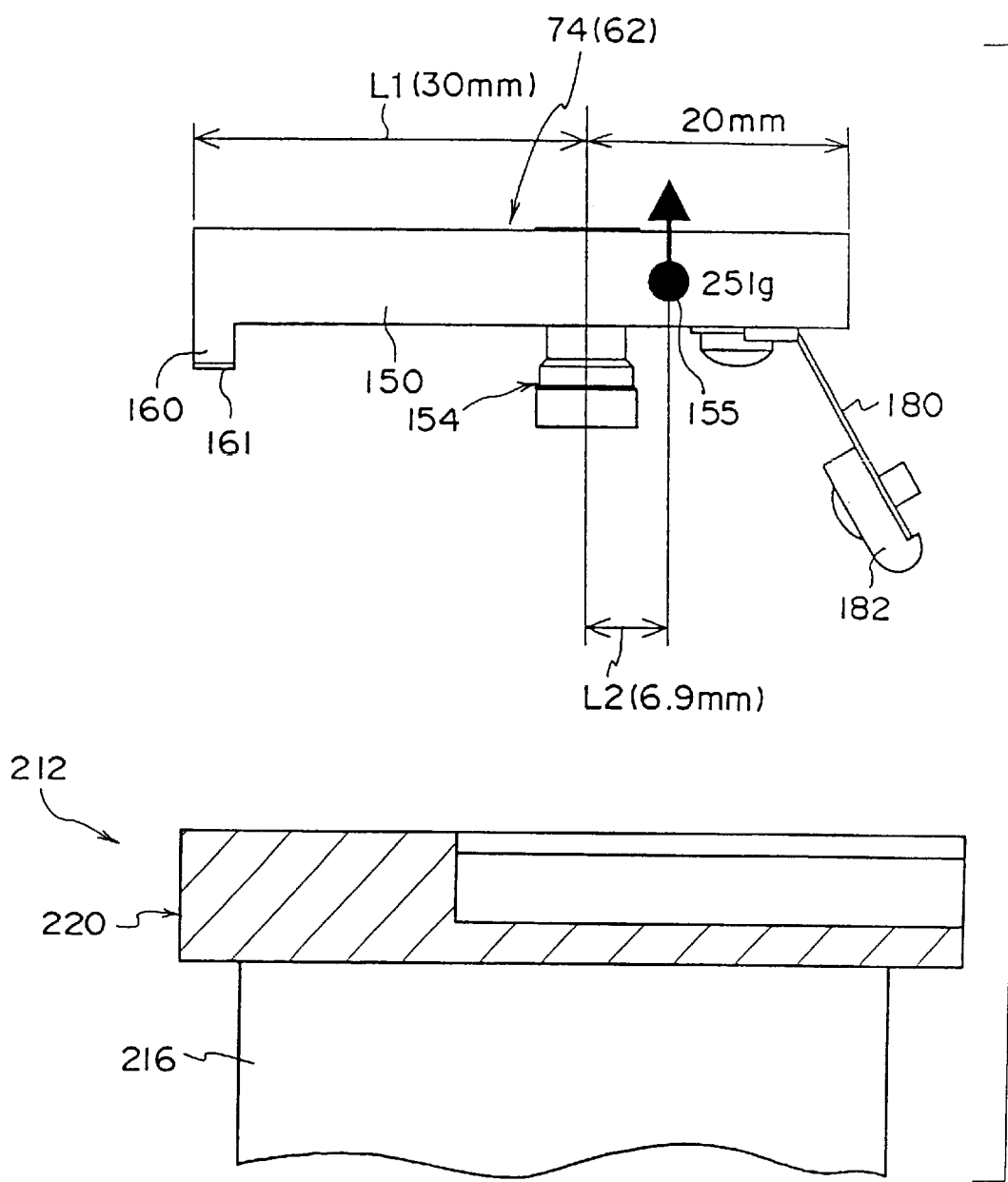
FIG. 4 is a side view of a chuck according to the first embodiment.

The trailing edge chucks 74 are formed by the four plates 150 whose lengths correspond to the intervals between the guide members 204. As shown in FIG. 4, the plate 150 is structured so as to pivot like a seesaw in a width direction of the plate 150 with a post 154 as a fulcrum. The post 154 attaches to and detaches from the chuck holding body 212.

As shown in FIG. 4, in a state in which all parts have been attached to the plates 150, a center of gravity 155 of the plate 150 is positioned further to a right side of FIG. 4 than an axis of the post 154.

A clamp 160 is formed at one end of the plate 150 in the width direction thereof (a left end in FIG. 4). The clamp 160 is formed so as to bend substantially perpendicular to the plate 150 toward the rotating shaft 200, and a rubber sheet 161 is stuck on an end surface of the clamp 160. The rubber sheet 161 is a portion in direct contact with the printing plate 12, and is an important element which determines a coefficient of friction when the printing plate 12 is nipped between the clamp 160 and the peripheral surface of the cylindrical body 210. Namely, a coefficient of friction $\mu 1$ between the clamp 160 and the printing plate 12 is determined by the rubber sheet 161. A coefficient of friction $\mu 2$ between the printing plate 12 and the outer periphery of the cylindrical body 210 is determined by material of each or the equivalent.

Further, one end of a plate spring 180 which is bent in a substantially L-shape is fixed on a lower surface of a right end of the plate 150 shown in FIG. 4. The plate spring 180 is bent toward the rotating drum 54, and an anchor 182 is attached to the other end of the plate spring 180. A surface of a tip of the anchor 182 is formed in an arced shape.

The plate spring 180 contacts and engages with the attachment/detachment portion 220 via the anchor 182. When the trailing edge chuck 74 approaches the chuck holding body 212, initially, the anchor 182 comes into contact with the attachment/detachment portion 220. Then, as the trailing edge chuck 74 continues to approach the chuck holders 212, the plate spring 180 is elastically deformed. Urging force generated by the elastic deformation of the plate spring 180 pivots the plate 150 on the post 154, and clamping force is thereby generated by the clamp 160.

The leading edge chuck 62, which has substantially the same structure as that of the trailing edge chuck 74, is attached to the guide members 204 at a predetermined position so as to wait for and clamp the leading edge of the printing plate 12 approaching from a tangential direction of the rotating drum 54. Since the printing plates 12 have various length dimensions depending on their size, the locations of the trailing edges after the printing plates 12 are wrapped are different. Accordingly, the rotating drum 54 of the present invention has a structure in which a position of the chuck holder 212 around the rotating shaft 200 is determined in accordance with the length of the printing plate 12 and the trailing edge chuck 74 is attached to the chuck holding body 212 with a predetermined timing so as to clamp the trailing edge of the printing plate 12. As a result, the leading edge and the trailing edge of the printing plate 12 can be clamped.

Hereinafter, an operation of the first embodiment will be described.

In the image exposure apparatus 10, when image data to be exposed onto the printing plate 12 is input, the size and the number of printing plates 12 to be subjected to image exposure are set, and when the image exposure is instructed to initiate, image exposure processing for the printing plates 12 initiates. The order to initiate the image exposure process may be given by operating an operation panel switch disposed the image exposure apparatus 10, or may be given by signals from an imaging apparatus or the like which outputs image data to the image exposure apparatus 10.

In the image exposure apparatus 10, when the image exposure processing is instructed to initiate, the feed unit 30 and the inverting unit 28 are moved to a position which corresponds to the cassette 16 accommodating the printing plates 12 having a specified size, the printing plate 12 in the cassette 16 is sucked and pulled out by the suction cups 38, and the printing plate 12 is fed between the inverting roller 32 of the inverting unit 28 and the conveyor belt 36. Accordingly, the printing plate 12 is nipped between the inverting roller 32 and the conveyor belt 36, and conveyed to the conveyor 42.

First, the conveyor 42 inserts the leading edge of the printing plate 12 into the gripper 60 of the puncher 58. Then, the puncher 58 forms the notch for positioning, at a predetermined position in the inserted printing plate 12. When the notch has been formed at the printing plate 12, the conveyor 42 pulls the printing plate 12 out from the gripper 60 of the puncher 58, and feeds out the printing plate 12 toward the peripheral surface of the rotating drum 54.

In the recording section 22, when the leading edge of the printing plate 12 is held against the rotating drum 54 by the leading edge chuck 62, the printing plate 12 is wound onto the rotating drum 54 while being squeezed by the squeeze roller 66, and the trailing edge of the printing plate 12 is held against the rotating drum 54 by the trailing edge chuck 74.

Thereafter, in the recording section 22, while the rotating drum 54 is being rapidly rotated, the printing plate 12 is irradiated, on the basis of image data, with a light beam emitted from the recording head portion 56 to scan-expose the printing plate 12. While the rotating drum 54 is being rapidly rotated, a force for nipping the printing plate 12 is applied to the leading edge chuck 62 and the trailing edge chuck 74 by a centrifugal force generated by the rotation of the rotating drum 54.

When the scan-exposure for the printing plate 12 has been completed, the leading edge chuck 62 is removed, and the printing plate 12 is fed out to the discharge buffer section 24.

In the discharge buffer section 24, the printing plate 12 is nipped between and conveyed by the small roller 80A and the roller 84 so as to be wound onto the discharge roller 78.

After that, the small roller 80A and the roller 84 are moved opposite to the discharge port 76, and the printing plate 12 is fed out from the discharge port 76 at a predetermined conveyance speed.

Next, a procedure for nipping and tensing the printing plate 12 between the rotating drum 54 and the leading edge chuck 62 or the trailing edge chuck 74, and maintenance of this state will be described.

When the leading edge of the printing plate 12 is inserted between the cylindrical bodies 210 of the guide members 204 and the plates 150, the leading edge chuck 62 is released from being prevented from rotating by the cam 64, such that the plates 150 pivot on the posts 154 due to urging force of the plate springs 180. This pivot moves the clamp portions 160 toward the peripheral surface of the rotating drum 54 so that the printing plate 12 can be nipped between the clamp portions 160 and the outer peripheries of the cylinders 210.

Further, the trailing edge chuck 74 is attached to the rotating drum 54 when the printing plate 12 has reached a predetermined position. Therefore, while the trailing edge chuck 74 is moving to be attached thereto, the plates 150 gradually pivot on the posts 154 due to urging force of the plate springs 180 so that the printing plate 12 which has been positioned can be nipped between the clamps 160 and the outer surfaces of the cylinders 210 of the guide members 204.

When the printing plate 12 has been completely chucked by the leading edge chuck 62 and the trailing edge chuck 74, the rotating drum 54 starts to rotate rapidly for image recording.

Since the center of gravity 155 of the plate 150 is positioned at the side of the post 154 opposite to the clamp 160, centrifugal force is applied to the center of gravity 155 in the same direction as the direction in which the plate spring 180 urges. Accordingly, while the rotating drum 54 is being rapidly rotated, namely, while images are being recorded, the force for nipping the printing plate 12 can be increased.

The external surface of the rotating drum 54 in the first embodiment is substantially composed of only the outer surfaces of the cylinders 210 of the guide members 204. Namely, the total area of the outer peripheral surfaces of the cylindrical bodies 210 is one fifth of the area of the external peripheral surface of the rotating drum 54.

The printing plate 12 is only engaged and guided by the outer surfaces of the cylinders 210 so as to be wound and supported thereon. The cylinder 210 is coaxially supported by the plural ribs 208 around the rotating shaft 200 so as to not become eccentric.

Five cylinders 210 are disposed along the axis of the rotating shaft 200 at predetermined intervals. Therefore, the cylinders 210 can support the entire printing plate 12 with substantially equal balance.

Further, the total area of the peripheral surfaces of the cylinders 210 can be determined based on a material and a thickness of the sheet-type member (the printing plate 12 in the first embodiment) to be wound. Since the printing plate 12 comprises the photosensitive layer formed (applied) on the support made of metal (aluminum) so as to have a degree of firmness, the printing plate 12 can hold itself in a substantially cylindrical shape even if it is merely rolled in the air. Therefore, the printing plate 12 can be accurately wound and held on the peripheral locus of a predetermined radius coaxial with the rotating shaft 200 merely by partially disposing the guide members 204 as auxiliary guides for the printing plate 12 to be positioned and winded upon.

In this case, each cylinder 210 has a continuous outer surface concentric with the rotating shaft 200, and thus, the locus around which the printing plate 12 is wound can be always maintained.

Accordingly, weight of the rotating drum 54 itself can be significantly reduced. As a result, the rapid rotation of the rotating drum 54 required for high-speed processing can be realized by a low-power driving system. Namely, an expensive high-power driving system is not necessary.

Figure 5:
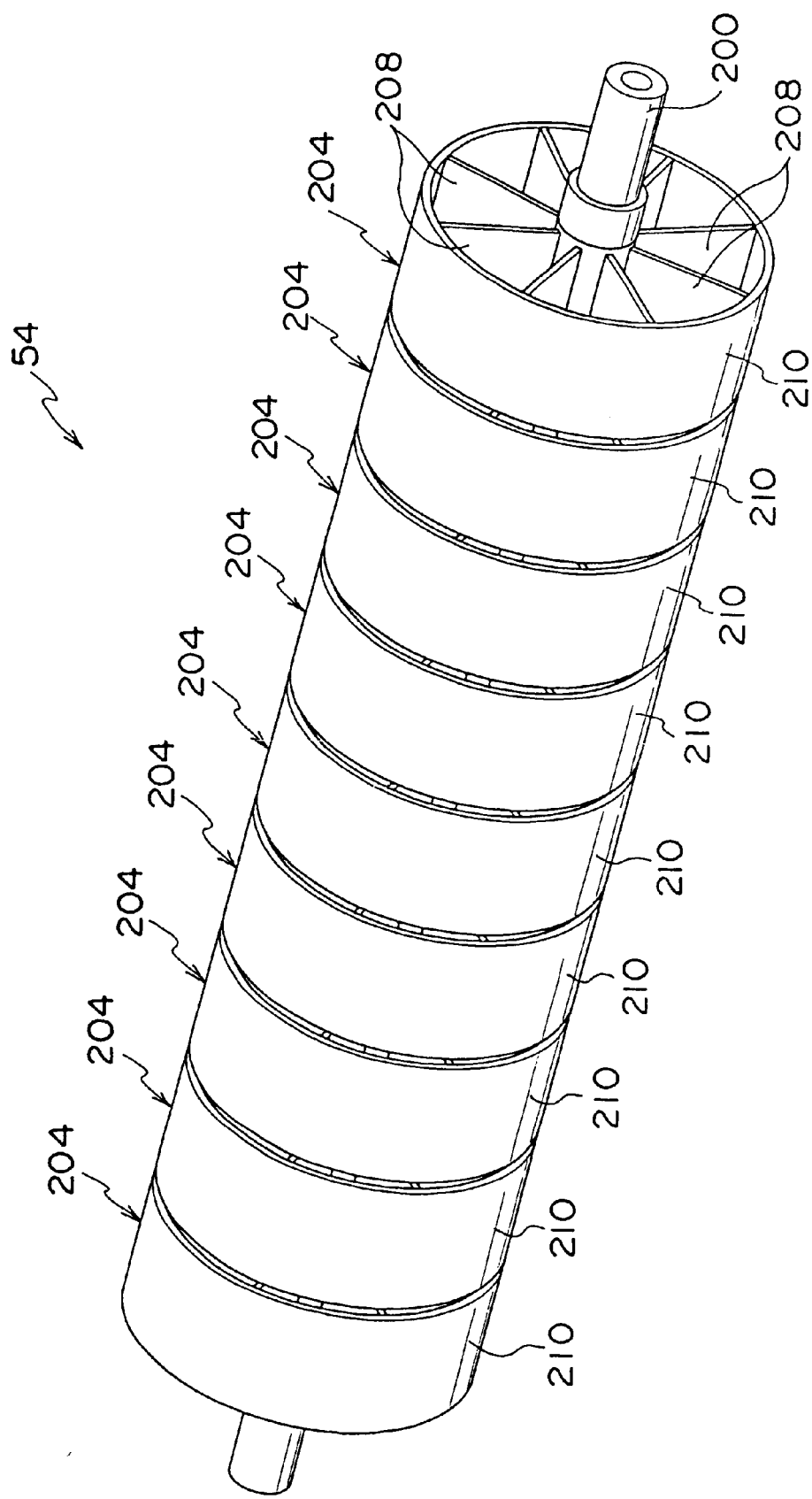
FIG. 5 is a perspective view showing a schematic structure of the rotating drum according to a modified example of the first embodiment.

In the first embodiment, the total area of the outer surfaces of the cylindrical bodies 210 of the guide members 204 is about one fifth of the area of the peripheral surface of the entire rotating drum 54. However, when a non-firm sheet-type member (printing plate 12) is wound thereon, a width of the cylinder 210 may be increased as shown in FIG. 5. In this case, a width of the rib 208 connecting the rotating shaft 200 and the cylinder 210 is also preferably increased.

In this case, if the adjacent guide members 204 contact each other, the rotating drum 54 having such guide members 204 is substantially the same as a conventional rotating drum 54, and is merely structured by separate parts. However, the object of the present invention is to lighten the rotating drum 54 as much as possible by reducing the area of the peripheral surface of the rotating drum 54 which contacts the wound printing plate 12. As a result (as a structure producing the fewest results), even if the gap between the guide members 204 is slight (as shown in FIG. 5), the rotating drum 54 which is intended to be lightened is different from that whose entire peripheral surface is just separately formed from the first, in their ideas.

Second Embodiment

Hereinafter, a second embodiment of the present invention will be described. In the following description of the second embodiment, components identical to those in the first embodiment will be referred to using the same reference numerals, and description thereof will be omitted. Namely, since the rotating drum 54 shown in FIG. 6 is a feature of the second embodiment, the overall structure of the device is the same as that shown in FIGS. 1 and 2 used for the first embodiment, and description thereof will be omitted.

Figure 6:
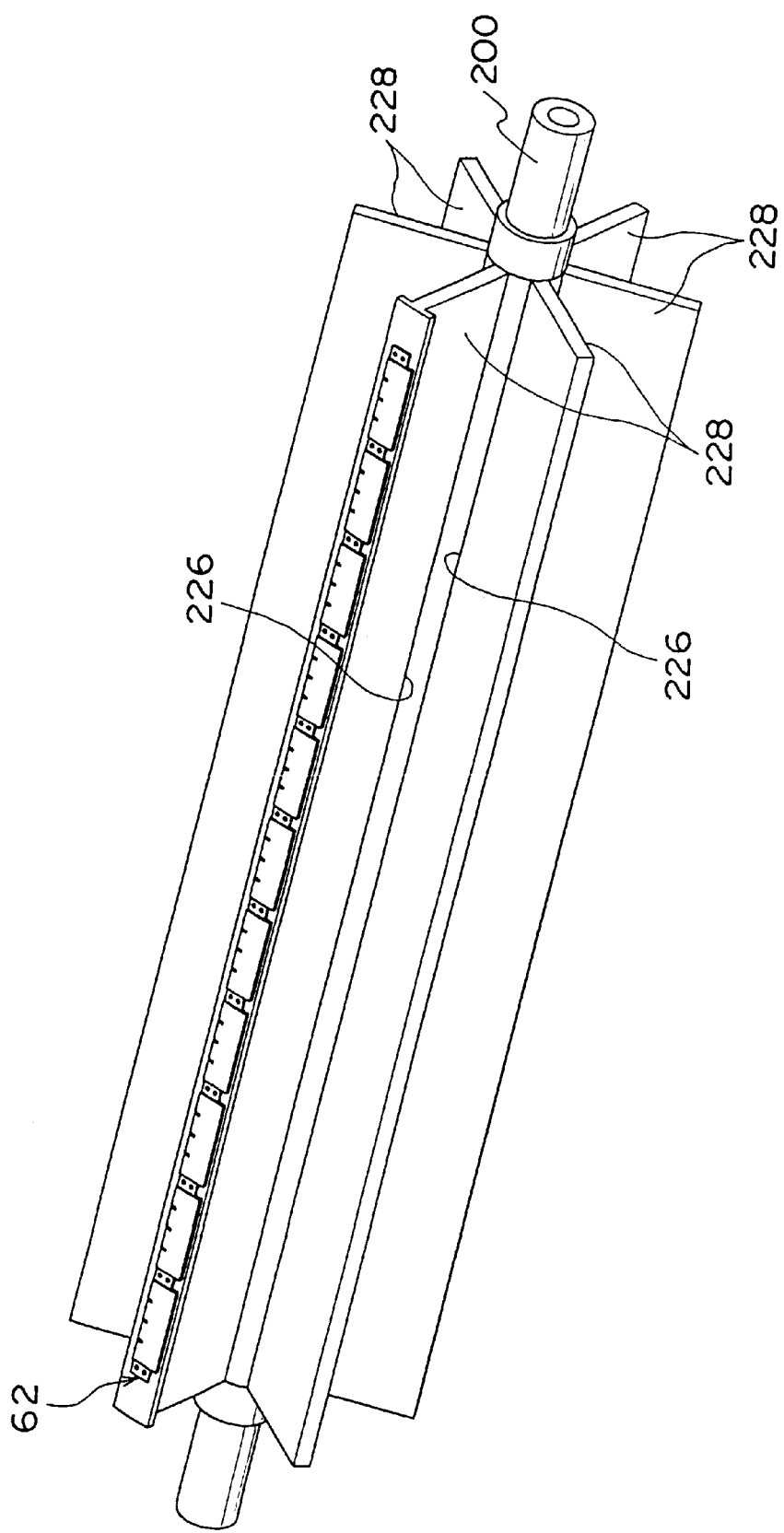
FIG. 6 is a schematic perspective view of the rotating drum according to the second embodiment.

As shown in FIG. 6, in the rotating drum 54 of the second embodiment, six elongated plates 228 which have sides 226 continuing along the axis of the rotating shaft 200 are provided around the rotating shaft 200 at intervals of a predetermined angle. Namely, in a sectional view which is perpendicular to the rotating shaft 200, the rotating drum 54 is star-shaped.

The plates 228 extend radially from the rotating shaft 200, with the sides 226 forming bases (proximal ends of the plates 228). Distal ends of the plates 228 are disposed on the peripheral locus for winding the printing plate 12.

The leading edge chuck 62 is attached to the distal end of only one of the six plates 228. The leading edge chuck 62 is substantially the same as that shown in FIG. 3. Similarly, the trailing edge chuck 74 is substantially the same as that shown in FIG. 3. However, since FIG. 6 shows a state in which the trailing edge chuck 74 is detached from the attachment/detachment portion 220, the trailing edge chuck 74 is not illustrated.

In the second embodiment, the distal ends of the plates 228 continue along the axial direction of the rotating shaft 200. This is particularly advantageous to hold the leading edge and the trailing edge of the printing plate 12 with the leading edge chuck 62 and the trailing edge chuck 74.

The printing plate 12 is intermittently supported around the rotating shaft 200. However, since the printing plate 12 used in the second embodiment is thick and made of a firm material, the printing plate 12 is suspended between the plates 228 with an arc having a uniform radius of curvature so that a satisfactorily cylindrical locus (peripheral locus) can be obtained, merely by being intermittently supported in the direction it is wound.

Figure 7:
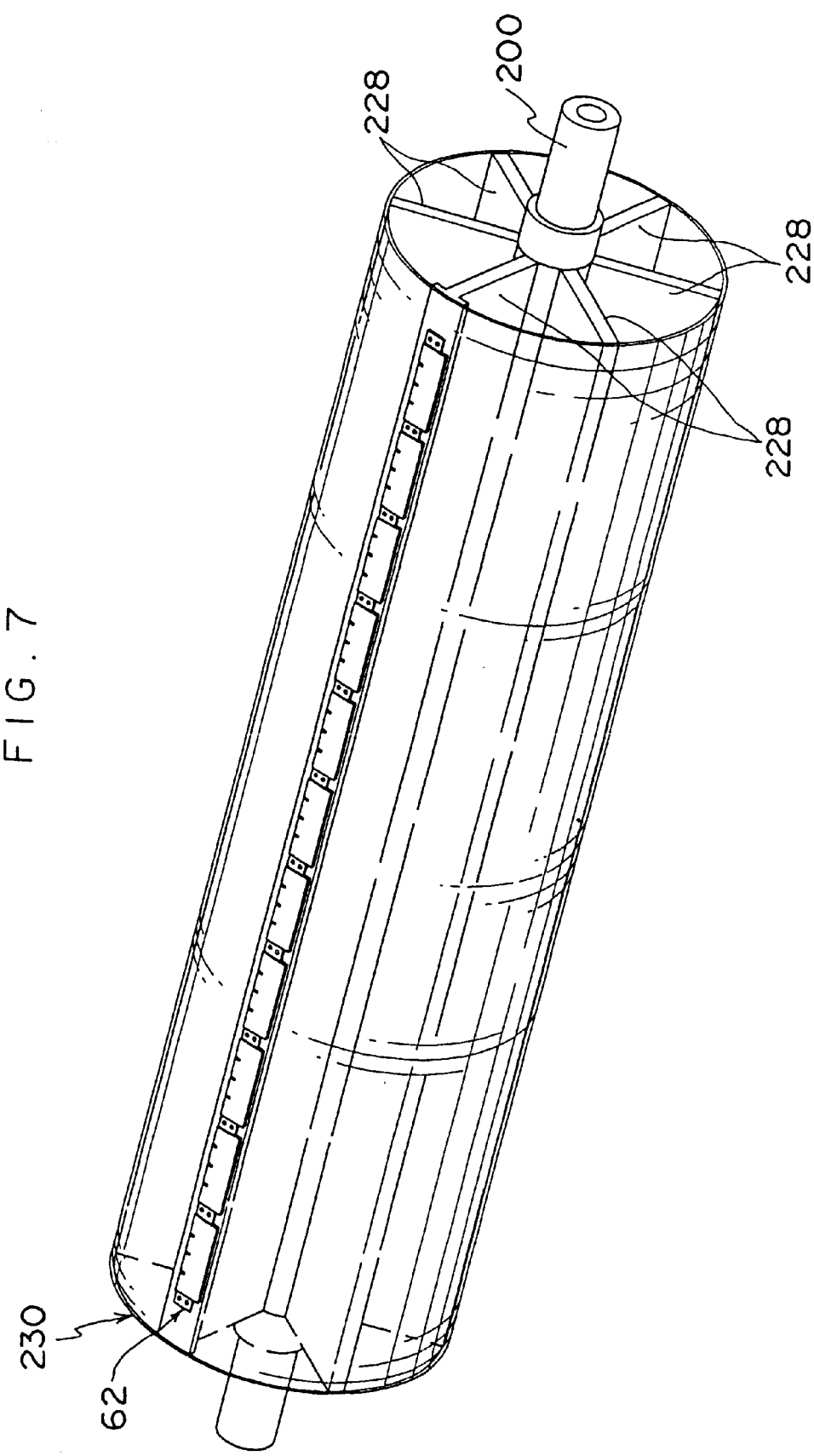
FIG. 7 is a perspective view showing a schematic structure of the rotating drum according to a modified example of the second embodiment.

When the sufficiently cylindrical locus cannot be obtained by changing the material or the like, a cylindrical bridging member 230 may be suspended between the plates 228 and attached as shown in FIG. 7. The bridging member 230 itself need not have a high strength, and can be a thin, film-type member.

Finally, a case in which centrifugal force is used in order to increase the holding force of the chucks while the printing plate 12 is being nipped and held by the leading edge chuck 62 and the trailing edge chuck 74 of the first and second embodiments will be described.

In this case, since the centrifugal force generated when the rotating drum 54 rotates rapidly is added to the spring force of the plate springs 180, the force of the leading edge chuck 62 and the trailing edge chuck 74 for holding the printing plate 12 is increased.

The leading edge chuck 62 and the trailing edge chuck 74 are structured so as to have dimensions, for example, shown in the following table 1. In table 1, thickness dimension t and consistency c of the printing plate 12, radius r of the rotating drum 54, and coefficients of friction $\mu 1$ and $\mu 2$ are also listed.

TABLE 1

| Items | Symbols | Values |
| --- | --- | --- |
| Weight of Chuck | m | 0.251 kg (Width of Chuck: 300 mm) |
| Distance from Post Centerline to Clamp | L1 | $30 \times 10^{-3}$ m |
| Distance from Post Centerline to Non-clamp End | — | $20 \times 10^{-3}$ m |
| Distance from Post Centerline to Center of Gravity | L2 | $6.9 \times 10^{-3}$ m |
| Coefficient of Friction between Clamp Portion and Printing Plate | $\mu 1$ | 1.0 |
| Coefficient of Friction between Printing Plate and Peripheral Surface of Cylindrical Body | $\mu 2$ | 0.5 |
| Radius of Rotating Drum | r | 0.165 |
| Density of Printing Plate | c | $2.7 \times 10^3$ kg/m |
| Thickness of Printing Plate | t | $0.3 \times 10^{-3}$ m |

These values listed in table 1 are set so that the following formula (1) can be formed and a maximum holding force due to the centrifugal force can be achieved.

$$\{(\mu 1+\mu 2) \times (L1/L2) \times m\} > c \times r \times t \qquad (1)$$

As described above, in accordance with the present invention, even when the drum is enlarged so as to correspond to a large-sized sheet-type member, weight of the drum is not significantly increased, and the drum can reliably wind and hold the sheet-type member. Further, the drum of the present invention can avoid the need for a high-power driving system for the increased weight.

What is claimed is:

1. A skeleton drum around which a sheet can be wound and fixed, the drum comprising:
   (A) a rotating shaft;
   (B) a plurality of narrow cylindrical supports, each support having a support surface for supporting the sheet and being arranged so as to be coaxial with the rotating shaft such that an interval, which is larger than a width of the support, is formed between the supports; and
   (C) a plurality of chucks for pressing a leading edge and a trailing edge of the sheet toward the rotating shaft.

2. The drum of claim 1, wherein the drum is for fixing the sheet when the sheet is to be scan-exposed.

3. The drum of claim 1, wherein each of the supports comprises a bearing attached around the rotating shaft, a narrow cylinder coaxial with the rotating shaft, and a plurality of ribs integrally connecting the bearing and the narrow cylinder.

4. The drum of claim 1, wherein the support surface of each support exists on an imaginary cylindrical surface which is coaxial with the rotating shaft.

5. The drum of claim 1, wherein the support surface of each support extends around a periphery of the drum.

6. The drum of claim 1, wherein the chucks include a leading edge chuck for pressing the leading edge of the sheet, and a trailing edge chuck for pressing the trailing edge of the sheet.

7. The drum of claim 6, wherein a position of the leading edge chuck around the periphery of the drum is fixed, and a position of the trailing edge chuck around the periphery of the drum is changeable.

8. The drum of claim 6, further comprising an urging structure, which urges the trailing edge chuck to pull the sheet around the periphery of the drum when the sheet is pressed by the trailing edge chuck.

9. The drum of claim 6, wherein the trailing edge chuck comprises:

a support structure comprising a support that is removably attached to the drum;

a plate, one end of which is for pressing the trailing edge of the sheet, and which is pivotally connected to the drum via the support structure; and an elastic element connected to an other end of the plate which, when the support is attached to the drum, applies force to the other end of the plate by being elastically deformed such that the one end of the plate pivotally rotates toward the rotating shaft to press the sheet.

10. The drum of claim 9, wherein a center of gravity of the plate is positioned between the ends, and the support is connected to the plate on the side of the one end, relative to the center of gravity such that a centrifugal force acting on the plate when the drum is rotated increases force for pressing the sheet.

* * * * *